United States Patent
Nyström et al.

(10) Patent No.: US 12,297,848 B2
(45) Date of Patent: May 13, 2025

(54) WORKING EQUIPMENT WITH CAPABILITIES OF PREVENTING BUCKLING OF HYDRAULIC CYLINDER

(71) Applicant: Hiab AB, Malmö (SE)

(72) Inventors: Mikko Nyström, Rusko (FI); Pasi Sirén, Kirjala (FI)

(73) Assignee: Hiab AB, Kista (SE)

( * ) Notice: Subject to any disclaimer, the term of this patent is extended or adjusted under 35 U.S.C. 154(b) by 0 days.

(21) Appl. No.: 18/502,407

(22) Filed: Nov. 6, 2023

(65) Prior Publication Data
US 2024/0150161 A1    May 9, 2024

(30) Foreign Application Priority Data
Nov. 7, 2022    (EP) .................................... 22205872

(51) Int. Cl.
*F15B 20/00*    (2006.01)
*B60P 1/16*    (2006.01)
(Continued)

(52) U.S. Cl.
CPC .............. *F15B 20/00* (2013.01); *B60P 1/162* (2013.01); *B60P 1/6463* (2013.01); *B66F 9/22* (2013.01);
(Continued)

(58) Field of Classification Search
CPC ..................... F15B 20/00; F15B 11/003; F15B 2211/30515; F15B 2211/6313; B60P 1/162; B60P 1/6463
See application file for complete search history.

(56) References Cited

U.S. PATENT DOCUMENTS

| 6,988,363 B2 | 1/2006 | Bitter |
| 10,189,393 B2 * | 1/2019 | Baldys ................. F15B 13/024 |

(Continued)

FOREIGN PATENT DOCUMENTS

| DE | 102012019863 B4 | 7/2018 |
| EP | 3064397 A1 | 9/2016 |

(Continued)

OTHER PUBLICATIONS

Extended European Search Report issued for priority European Regional Application No. 22205872.9, mailed May 8, 2023.

*Primary Examiner* — Dustin T Nguyen
(74) *Attorney, Agent, or Firm* — Renner, Otto, Boisselle, & Sklar, LLP.

(57) ABSTRACT

A working equipment including a base; a movable arm; a hydraulic system including a hydraulic cylinder provided with a cylinder cavity a piston, and a piston rod, the piston dividing the cylinder cavity in a first chamber and a second chamber; and a load holding valve unit. A pressure measurement member is arranged to measure pressure of the hydraulic fluid in the second chamber during an outward movement procedure of the piston rod. A working equipment control system is arranged configured to receive measured pressure values obtained in the second chamber during an outward movement procedure, and to evaluate the measured pressure values by applying at least one evaluation criterion related to risk of hydraulic cylinder buckling of the hydraulic cylinder. The working equipment control system is further configured to perform a predetermined activity to reduce the risk of hydraulic cylinder buckling in dependence of the result of the evaluation.

16 Claims, 3 Drawing Sheets

(51) Int. Cl.
  *B60P 1/64* (2006.01)
  *B66F 9/22* (2006.01)
  *F15B 11/00* (2006.01)
  *F15B 11/028* (2006.01)
  *F15B 13/01* (2006.01)

(52) U.S. Cl.
  CPC ........... *F15B 11/003* (2013.01); *F15B 11/028* (2013.01); *F15B 13/01* (2013.01); *F15B 2211/30515* (2013.01); *F15B 2211/6313* (2013.01); *F15B 2211/6346* (2013.01); *F15B 2211/864* (2013.01)

(56) References Cited

U.S. PATENT DOCUMENTS

| | | | |
|---|---|---|---|
| 10,280,948 B2 | 5/2019 | Vigholm | |
| 11,383,629 B2 * | 7/2022 | Hertog | B60P 1/045 |
| 2003/0141132 A1 * | 7/2003 | Kowalyk | A01B 63/1013 |
| | | | 180/306 |
| 2008/0238180 A1 | 10/2008 | Kraenzle | |

FOREIGN PATENT DOCUMENTS

| | | |
|---|---|---|
| EP | 3141420 A1 | 3/2017 |
| EP | 3290265 A1 | 3/2018 |
| WO | 2006012708 A1 | 2/2006 |

\* cited by examiner

WORKING EQUIPMENT WITH CAPABILITIES OF PREVENTING BUCKLING OF HYDRAULIC CYLINDER

This application claims priority to European Patent Application No. 22205872.9, filed Nov. 7, 2022, which is hereby incorporated herein by reference in its entirety.

TECHNICAL FIELD

The present disclosure relates to a working equipment, e.g. a hooklift mounted to a vehicle, provided with capabilities of preventing buckling of a double-acting cylinder in a hydraulic system, a vehicle including the working equipment, and to a method of the working equipment.

BACKGROUND

Working equipment, such as hooklifts, cranes, forestry equipment, agricultural equipment, etc., are typically using double-acting cylinders of hydraulic cylinders as lifting cylinders etc. The cylinders are constructed to withstand high forces when lifting, pulling or pushing heavy objects and loads but the boundaries of what the equipment can handle may be surpassed during some use cases. Working with heavy loads means that there is a risk for buckling of the cylinder if the equipment is operated with too high forces.

One particular application of a hooklift is during an unloading procedure of a loader bed when the loader bed is partly unloaded and the rear end's rollers are on ground but being hindered by an obstacle on ground. The hydraulic cylinders then increase the force in the outward direction of the piston rods of the hydraulic cylinders which increases the risk of buckling of the cylinders.

Cylinder buckling is a sudden, large, and unstable lateral deflection. It can be associated with only a small increase in compressive load above a critical level, known as the buckling load. The corresponding stress can be far less than the yield strength of the rod material.

Some current solutions are based on estimating the differential pressure of the cylinder, using pressure sensors on both the piston side chamber and the rod side chamber to enable accurate force calculations, or, to use a hydraulic solution to ensure so-called Main Ram Protection (MRP).

In a typical situation of a hooklift mounted at a vehicle, when moving a container from the vehicle with the hooklift onto either a trailer or a platform, the truck remains stationary and the container is pushed by the hooklift. If some obstacle restricts the movement, the hooklift will stop by applying any known solution, and the operator can easily retract the main cylinders to remove the obstacle and then safely retry transferring the container.

U.S. Ser. No. 10/280,948B2 discloses a hydraulic system providing a working mechanism that includes a hydraulic cylinder for raising and lowering an implement. A pressure sensor is provided for measuring the pressure in the hydraulic cylinder and a control unit for controlling the movement of the cylinder. The control unit is configured to compare the pressure value to add or reduce the fluid from the cylinder.

U.S. Pat. No. 6,988,363B2 relates to suspension for a boom of a loading vehicle consisting of a hydraulic cylinder for raising and lowering the boom. A control valve is provided for routing of oil to the cylinder. A pressure sensor for measuring pressure in the cylinder. The rod is returned when the pressure difference is equal to the preset threshold.

EP3141420A1 highlights about load transporter vehicle which consists of a base frame that is connected with an extension arm. A double-acting hydraulic cylinder is provided for a lifting arm. Also, a load-holding valve and a pressure sensor are present on one or both hydraulic cylinders. An angle sensor is also given for measuring the angle of the inclination with respect to ground level. Further, if the pressure difference measured by the pressure sensor is greater than the specified limit value then the control device operates in normal operation same as the pressure is lower than the limit then the control device operates in rapid traverse.

DE102012019863B4 relates to a hydraulic system which is used in generic vehicles and is assembled in between two vehicles. A pressure sensor and a check valve are connected to the hydraulic cylinder at the piston rod side.

There is a need to reduce the complexity and cost of the current solutions, in particular in solutions applied for working equipment such as hooklifts. Thus, the object of the present invention is to achieve an improved working equipment for preventing cylinder buckling of the hydraulic cylinders that is less complex and thus less expensive than the presently applied solutions.

SUMMARY

The above-mentioned objects are achieved by the present invention according to the independent claims.

Preferred embodiments are set forth in the dependent claims.

The working equipment according to the present invention is configured to determine if the forces are too high and is hence based on pressure monitoring from a sole pressure sensor on the piston rod side of the hydraulic cylinder. By monitoring the pressure of only one of the double acting cylinder's chambers, conclusions can be made regarding the cylinder force even though the pressure measurement of the other side of the piston is missing.

It might be seen as counterintuitive to monitor the pressure of the piston rod side, i.e. in a second chamber of the hydraulic cylinder, during an outward movement of the cylinder to estimate the force. However, this approach will allow for circumventing problems with high flows during regenerative functions, which would otherwise be a problem if measuring the pressure of the piston side, i.e. in a first chamber of the hydraulic cylinder.

Although the accuracy and level of detail in the force estimation might be affected by only having the pressure monitoring of one cylinder chamber some conclusions are still possible to make in terms of if the level of the force introduces a risk to buckling. An analog pressure sensor is preferred, but the invention may also be implemented with a so-called pressure switch.

The geometrical dimensions and requirements on hydraulic cylinders used as the main cylinder(s) on hooklifts make a particular good fit for the concept of this invention.

The predefined pressure thresholds used when evaluating measured pressure values, may be set to be configurable for the dimensions of the piston rod and cylinder chambers and fine-tuned for a specific installation.

DETAILED DESCRIPTION

The working equipment, and the method of the working equipment, will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
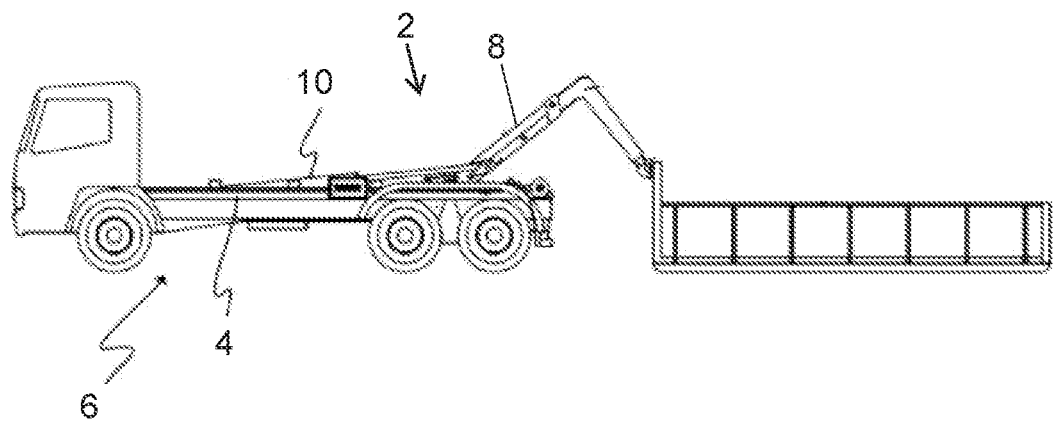
FIG. 1 is a side view of a vehicle provided with a working equipment according an embodiment of the present invention.

The working equipment defined herein may be a hooklift mounted on a vehicle, which is illustrated in FIG. 1. The working equipment may also be cranes, forestry equipment, agricultural equipment etc. that all are typically using the kinds of hydraulic cylinders as lifting cylinders etc. on which the present invention may be applied.

The hooklift typically comprises a hydraulic system 10, e.g. comprising a pair of mechanically connected hydraulic cylinders, here referred to as the main cylinders, which are controlling the angle of a main lift arm 8 with reference to the horizontal plane of base 4 of the vehicle 6. The main lift arm 8 may further comprise a main section and a movable section, such as a telescopic part that is movable in relation to the main section, to which a hook is attached to, that in turn may be attached to a loader container which is shown in FIG. 1.

Figure 2:
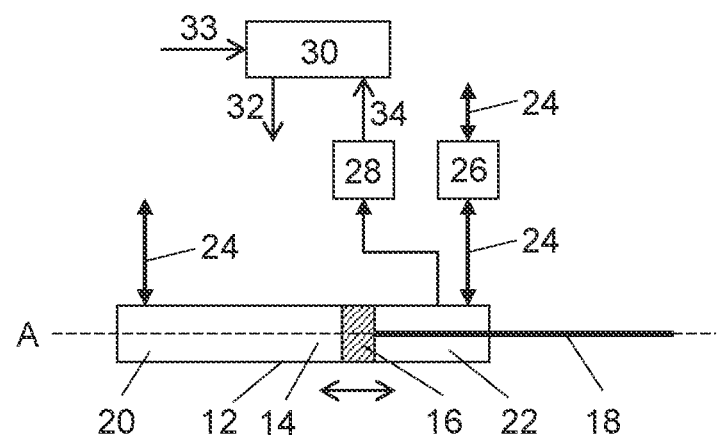
FIG. 2 is a block diagram schematically illustrating the present invention.

With references to FIGS. 1 and 2, the working equipment 2, e.g. a hooklift, will now be described.

The working equipment 2 comprises a base 4, e.g. a hooklift subframe, arranged to be mounted to a vehicle 6; a movable arm 8 connected to the base 4, and a hydraulic system 10.

The hydraulic system 10 comprises an elongated double-acting hydraulic cylinder 12 having a longitudinal axis A and provided with a cylinder cavity 14, and a piston 16 arranged to move forth and back within the cylinder cavity 14 along said longitudinal axis, and a piston rod 18 attached to the piston 16. The movement of the piston is schematically indicated by a double-arrow.

The piston 16 divides the cylinder cavity 14 in a first chamber 20 and a second chamber 22, where the second chamber 22 being on the rod side of the piston 16.

The piston rod 18 is attached to and arranged to control movements of the arm 8 relative to the base 4 in response to the supply and return of hydraulic fluid to the hydraulic cylinder 12 via hydraulic lines 24. In FIG. 2, the hydraulic lines are schematically illustrated as double arrows, and are conventionally embodied by hydraulic pipes that in turn are connected to one or many hydraulic fluid pumps (not shown).

A load holding valve unit 26 is arranged on the hydraulic line 24 for the supply and return of hydraulic fluid to and from the second chamber 22 of the hydraulic cylinder 12.

Load-holding valves, also known as over-center valves or counterbalance valves, are a type of pressure control valves that prevent loads on cylinders or motors dropping in an uncontrolled manner. For this purpose, they are pre-loaded with a pressure setting that is higher than the largest possible load. Load holding valves provide increased safety and performance in many hydraulic system applications.

At least one pressure measurement member 28 is arranged, configured to measure pressure of the hydraulic fluid of the hydraulic system 10.

A working equipment control system 30 is provided, arranged to generate driving instructions 32 to be applied to the hydraulic system 10 based on a set of operating instructions 33 defining wanted movements of the movable arm, measured pressure values and stored control parameters.

The operating instructions may be generated by a control device, e.g. a handheld controller, in response of input operation commands from an operator, or being automatically generated in a semi-automatic or fully automatic system.

The working equipment also comprises a pressure measurement member 28 specifically arranged to measure the pressure of the hydraulic fluid in the second chamber 22 of the hydraulic cylinder 12 during an outward movement procedure of the piston rod 18, and to generate pressure values 34 in dependence thereto.

The pressure measurement member may be configured to measure the pressure either directly within the second chamber, or within the hydraulic line connecting the second chamber and the load holding valve.

The pressure measurement member may e.g. be an analog pressure sensor, a CAN bus pressure sensor, or a so-called pressure switch particularly in cases where a simpler control is sufficient.

Thereby, the working equipment defined herein may be adapted to the complexity level of the control. If a pressure switch is applied the generated pressure values then include information if the measured pressure value is above or below a specified predefined threshold, e.g. as a digital signal with two states.

Thus, an analog pressure sensor is preferred, as it is generating signals representing analog pressure measurement values with higher accuracy, but the pressure measurement member may be implemented with a pressure switch.

The working equipment control system 30 is configured to receive the measured pressure values 34 obtained in the second chamber 22 during an outward movement procedure, and to evaluate the measured pressure values by applying at least one evaluation criterion related to risk of hydraulic cylinder buckling of the hydraulic cylinder 12.

The working equipment control system 30 is further configured to perform at least one predetermined activity to reduce the risk of hydraulic cylinder buckling in dependence of the result of said evaluation. This predetermined activity, could for example be to alert an operator of the risk of cylinder buckling, to reduce the speed of movement of the piston rod, or to stop the movement of the piston rod. These activities will be further outlined below.

According to one embodiment, one evaluation criterion comprises to compare the measured pressure values 34 to a first predefined pressure threshold P1 defining a severe risk of hydraulic cylinder buckling during an outward movement procedure of the piston rod 18.

If as a result of the comparison, it is determined that the measured pressure is lower than the first predefined pressure threshold P1, the working equipment control system 30 is configured to perform an activity to reduce the risk of hydraulic cylinder buckling being to generate driving instructions 32 to stop the movement of the rod.

According to another embodiment, one evaluation criterion comprises to compare the measured pressure values 34 to a second predefined pressure threshold P2 defining an increased risk of hydraulic cylinder buckling during an outward movement procedure of the piston rod 18.

If, as a result of the comparison, it is determined that the measured pressure is lower than the second predefined pressure threshold P2, the working equipment control system 30 is configured to perform an activity to reduce the risk of hydraulic cylinder buckling. This could be to generate an alert to the operator of the working equipment 2 and/or to adapt the generated driving instructions 32 to be applied to the hydraulic system 10 to reduce the movement speed of the piston rod 18.

In a further embodiment, the at least one evaluation criterion, including e.g. the first and second predefined pressure thresholds, are based and determined upon a known relationship between pressure values in the second chamber 22, and outward movement forces of the hydraulic cylinder 12.

This relationship will now be discussed more in detail, in particular with references to FIG. 3, that shows an example of theoretical main cylinder chamber pressures—in outward movement. Similar relationships may be assembled based on measurements or theoretical analysis of a particular hydraulic system, given the characteristics of the hydraulic components such as the hydraulic cylinder and load holding valve, and flow in the system.

Figure 3:
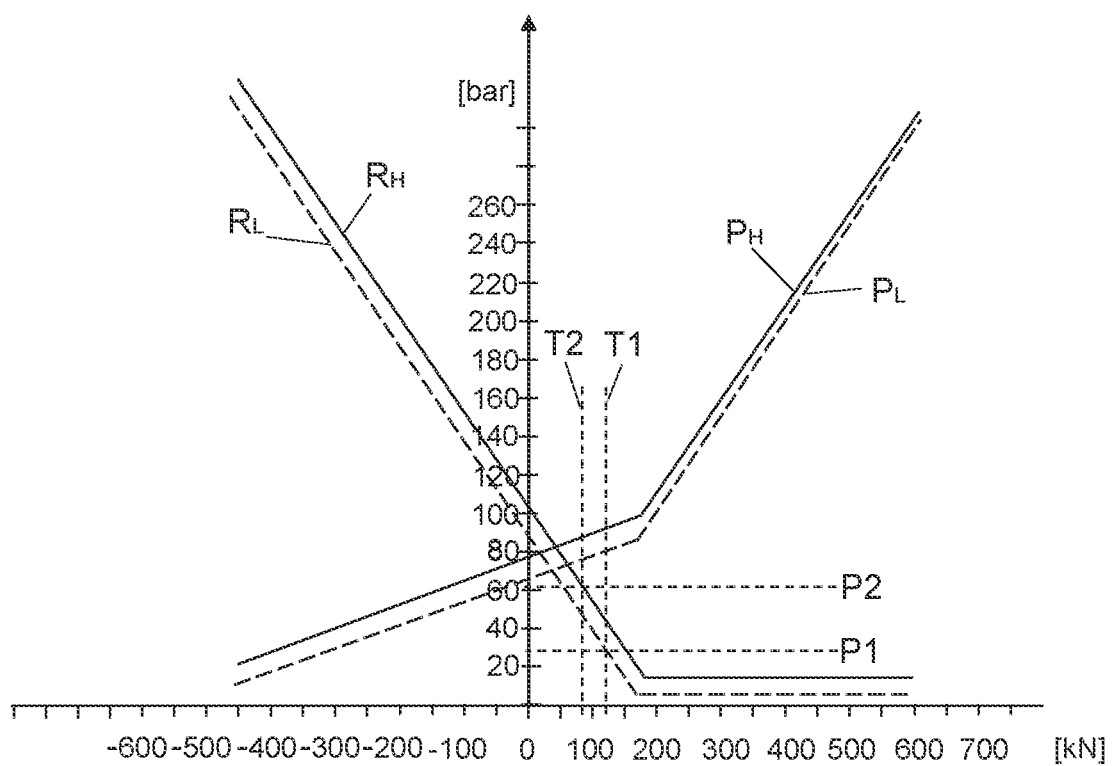
FIG. 3 is a graph of pressure versus force illustrating aspects of the present invention.

FIG. 3 is a diagram illustrating the pressure in bar on the Y-axis, and the force in kN on the X-axis during outward movement of the piston rod. The curves $P_H$ and $P_L$ denote the pressure in the first chamber 20, i.e. on the "piston side", where $P_H$ (solid line) denotes the pressure during high flow mode and $P_L$ (dashed line) denotes pressure during low flow mode, where the piston rod is moved at a higher speed when in the high flow mode.

The curves $R_H$ and $R_L$ denote the pressure in the second chamber 22, i.e. on the "rod side", where $R_H$ (solid line) denotes the pressure during high flow mode and $R_H$ (dashed line) denotes pressure during low flow mode, where the piston rod is moved at a higher speed when in the high flow mode.

A first predefined threshold T1, a second predefined threshold T2, a first predefined pressure threshold P1, and a second predefined pressure threshold P2 are also indicated in the figure.

When the cylinder rod is moving outwards the rod side pressure (see the development of the line denoted $R_H$) is mainly depending on the size of the pulling load force; the bigger the pulling force the bigger the rod side pressure.

When pressure decreases below a certain threshold value (e.g. ~100 bar) it means that the cylinder force is developing from pulling to pushing force, i.e. the force in this shown example will become positive. If the pushing force continues to increase the rod side pressure decreases even lower (e.g. ~100 bar→~50 . . . 60 bar). At this stage, when the $R_H$-curve crosses T2, i.e. the measured pressure is below a second predefined pressure threshold P2, e.g. a warning can be given to the user about danger of buckling and/or, the cylinders can e.g. be forced into a low flow mode.

If the pushing force continues to increase, now in a low flow mode following the $R_L$-curve, the rod side pressure will continue to decrease (e.g. ~50 . . . 60 bar→~30 bar) and will come to a stage where the movement should be fully stopped when the $R_L$-curve crosses T1, and thus the measured pressure is below the first predefined pressure threshold P1.

FIG. 3 also illustrates that the slope of the relationship between the pressure and force is larger for the rod chamber. i.e. the second chamber 22, than for the piston chamber i.e. the first chamber 20. This also means that the accuracy will be higher when monitoring the pressure on the rod side (second chamber) than on the piston side (first chamber).

A set of evaluation criteria may be provided to be applied to evaluate the measured pressure values related to risk of hydraulic cylinder buckling of the hydraulic cylinder 12. Above, two different evaluation criteria have been described with reference to FIG. 3. In another evaluation criterion a more advanced evaluation method may be applied by analyzing a set of obtained pressure values using pattern recognition, i.e. matching the obtained pressure values to a number of stored pressure value patterns representing different types and sizes of hydraulic cylinders.

The present invention also relates to a method of a working equipment 2, e.g. a hooklift, arranged to be mounted to e.g. a vehicle 4. The working equipment has been described in detail above and it is herein referred to that description. The method will now be described with references to the flow diagram shown in FIG. 4.

Thus, a method of a working equipment 2 is provided, where the working equipment comprises a base 4 arranged to be mounted to a vehicle 6; a movable arm 8 connected to the base 4, and a hydraulic system 10.

The hydraulic system 10 comprises an elongated double-acting hydraulic cylinder 12 having a longitudinal axis A and provided with a cylinder cavity 14, and a piston 16 arranged to move forth and back within the cylinder cavity 14 along the longitudinal axis, and a piston rod 18 attached to the piston 16. The piston 16 divides the cylinder cavity 14 in a first chamber 20 and a second chamber 22, where the second chamber 22 being on the rod side of the piston 16. The piston rod 18 is attached to and arranged to control movements of the arm 8 relative to the base 4 in response to the supply and return of hydraulic fluid to the hydraulic cylinder 12 via hydraulic lines 24. A load holding valve unit 26 is arranged on the hydraulic line 24 for the supply and return of hydraulic fluid to and from the second chamber 22 of the hydraulic cylinder 12, and at least one pressure measurement member 28 is provided, configured to measure pressure of the hydraulic fluid of the hydraulic system 10. The working equipment further comprises a working equipment control system 30 arranged to generate driving instructions 32 to be applied to the hydraulic system 10 based on a set of operating instructions defining wanted movements of the movable arm, measured pressure values and stored control parameters.

Figure 4:
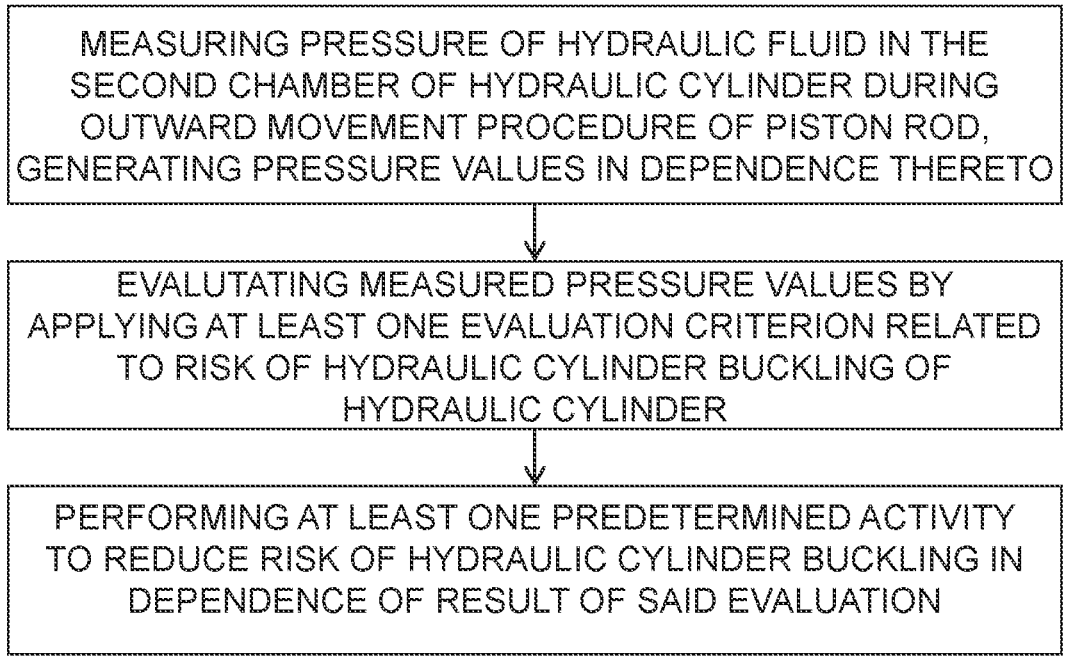
FIG. 4 is a flow diagram of the method according to the present invention.

With references to the flow diagram shown in FIG. 4, the method comprises:
  Measuring the pressure of the hydraulic fluid in the second chamber 22 of the hydraulic cylinder 12 during an outward movement procedure of the piston rod 18, and generating pressure values 34 in dependence thereto.
  Evaluating said measured pressure values by applying at least one evaluation criterion related to risk of hydraulic cylinder buckling of said hydraulic cylinder 12.
  Performing at least one predetermined activity to reduce the risk of hydraulic cylinder buckling in dependence of the result of said evaluation.

In the following, some embodiments of the method are listed. These have the same technical features and advantages as for the corresponding features of the working equipment described above. Consequently, these technical features and advantages are not repeated or explained anew in order to avoid unnecessary repetition.

According to one embodiment, one evaluation criterion comprises comparing the measured pressure values 34 to a first predefined pressure threshold defining a severe risk of hydraulic cylinder buckling during an outward movement procedure of the piston rod 18. If, as a result of said comparison, it is determined that the measured pressure is lower than the first predefined pressure threshold, the method comprises performing an activity to reduce the risk of hydraulic cylinder buckling being generating driving instructions 32 to stop the movement of the rod.

According to another embodiment, one evaluation criterion comprises comparing the measured pressure values 34 to a second predefined pressure threshold defining an increased risk of hydraulic cylinder buckling during an outward movement procedure of the piston rod 18. If, as a result of the comparison, it is determined that the measured pressure is lower than the second predefined pressure threshold, the method comprises performing an activity to reduce the risk of hydraulic cylinder buckling being generating an alert to the operator of the working equipment 2 and/or adapting the generated driving instructions 32 to be applied to the hydraulic system 10 to reduce the movement speed of the piston rod 18.

In a further embodiment, the at least one evaluation criterion, including e.g. the first and second predefined pressure thresholds, are based and determined upon a known relationship between pressure values in the second chamber 22, and outward movement forces of the hydraulic cylinder 12.

According to still another embodiment, the method comprises measuring the fluid pressure on a hydraulic line 24 between the load holding valve 26 and the second chamber 22.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A working equipment comprising:
   a base arranged to be mounted to a vehicle;
   a movable arm connected to the base;
   a hydraulic system comprising an elongated double-acting hydraulic cylinder having a longitudinal axis A and provided with a cylinder cavity, and a piston arranged to move forth and back within the cylinder cavity along said longitudinal axis, and a piston rod attached to the piston, the piston dividing the cylinder cavity into a first chamber and a second chamber, the second chamber being on the rod side of the piston, wherein the piston rod is attached to and arranged to control movements of the arm relative to the base in response to the supply and return of hydraulic fluid to/from the hydraulic cylinder via hydraulic lines;
   a load holding valve unit arranged on the hydraulic line for the supply and return of hydraulic fluid to and from the second chamber of the hydraulic cylinder;
   at least one pressure measurement member configured to measure a pressure of the hydraulic fluid of the hydraulic system, and
   a working equipment control system arranged to generate driving instructions to be applied to the hydraulic system based on a set of operating instructions defining wanted movements of the movable arm, measured pressure values and stored control parameters,
   wherein said at least one pressure measurement member is arranged to measure the pressure of the hydraulic fluid in the second chamber of the hydraulic cylinder during an outward movement procedure of the piston rod, and to generate pressure values in dependence thereto, wherein the working equipment control system is configured to receive the measured pressure values obtained in the second chamber during an outward movement procedure, and to evaluate said measured pressure values by applying at least one evaluation criterion related to risk of hydraulic cylinder buckling of said hydraulic cylinder, and wherein said working equipment control system is further configured to perform at least one predetermined activity to reduce the risk of hydraulic cylinder buckling in dependence of the result of said evaluation.

2. The working equipment according to claim 1, wherein the at least one evaluation criterion comprises to compare the measured pressure values to a first predefined pressure threshold defining a severe risk of hydraulic cylinder buckling during an outward movement procedure of the piston rod, and if, as a result of said comparison, it is determined that the measured pressure is lower than the first predefined pressure threshold P1, the working equipment control system is configured to perform an activity to reduce the risk of hydraulic cylinder buckling being to generate driving instructions to stop the movement of the rod.

3. The working equipment according to claim 2, wherein said first predefined pressure threshold is based upon a known relationship between pressure values in said second chamber, and outward movement forces of the hydraulic cylinder.

4. The working equipment according to claim 1, wherein the at least one evaluation criterion comprises to compare the measured pressure values to a second predefined pressure threshold defining an increased risk of hydraulic cylinder buckling during an outward movement procedure of the piston rod, and if, as a result of said comparison, it is determined that the measured pressure is lower than the second predefined pressure threshold P2, the working equipment control system is configured to perform an activity to reduce the risk of hydraulic cylinder buckling being to generate an alert to the operator of the working equipment and/or to adapt the generated driving instructions to be applied to the hydraulic system to reduce the movement speed of the piston rod.

5. The working equipment according to claim 1, wherein said at least one evaluation criterion is based upon a known relationship between pressure values in said second chamber, and outward movement forces of the hydraulic cylinder.

6. The working equipment according to claim 1, wherein said pressure measurement member is arranged to measure the fluid pressure on a hydraulic line between said load holding valve unit and said second chamber.

7. The working equipment according to claim 1, wherein said working equipment is a hooklift.

8. A vehicle comprising a working equipment according to claim 1.

9. The working equipment according to claim 1, wherein the at least one evaluation criterion comprises to compare the measured pressure values to a first predefined pressure threshold defining a severe risk of hydraulic cylinder buckling during an outward movement procedure of the piston rod, and if, as a result of said comparison, it is determined that the measured pressure is lower than the first predefined pressure threshold P1, the working equipment control system is configured to perform an activity to reduce the risk of hydraulic cylinder buckling being to generate driving instructions to stop the movement of the rod;
   wherein the at least one evaluation criterion further comprises to compare the measured pressure values to a second predefined pressure threshold defining an increased risk of hydraulic cylinder buckling during an outward movement procedure of the piston rod, and if, as a result of said comparison, it is determined that the measured pressure is lower than the second predefined pressure threshold P2, the working equipment control system is configured to perform an activity to reduce the risk of hydraulic cylinder buckling being to generate an alert to the operator of the working equipment and/or to adapt the generated driving instructions to be applied to the hydraulic system to reduce the movement speed of the piston rod;

wherein said first and second predefined pressure thresholds, respectively, are based upon a known relationship between pressure values in said second chamber, and outward movement forces of the hydraulic cylinder.

10. A method of a working equipment, where the working equipment comprises:
a base arranged to be mounted to a vehicle;
a movable arm connected to the base;
a hydraulic system comprising an elongated double-acting hydraulic cylinder having a longitudinal axis A and provided with a cylinder cavity, and a piston arranged to move forth and back within the cylinder cavity along said longitudinal axis, and a piston rod attached to the piston, the piston dividing the cylinder cavity into a first chamber and a second chamber, the second chamber being on the rod side of the piston, wherein the piston rod is attached to and arranged to control movements of the arm relative to the base in response to the supply and return of hydraulic fluid to/from the hydraulic cylinder via hydraulic lines;
a load holding valve unit arranged on the hydraulic line for the supply and return of hydraulic fluid to and from the second chamber of the hydraulic cylinder;
at least one pressure measurement member configured to measure a pressure of the hydraulic fluid of the hydraulic system, and
a working equipment control system arranged to generate driving instructions to be applied to the hydraulic system based on a set of operating instructions defining wanted movements of the movable arm, measured pressure values and stored control parameters,
wherein said method comprises:
measuring the pressure of the hydraulic fluid in the second chamber of the hydraulic cylinder during an outward movement procedure of the piston rod, and generating pressure values in dependence thereto;
evaluating said measured pressure values by applying at least one evaluation criterion related to risk of hydraulic cylinder buckling of said hydraulic cylinder, and
performing at least one predetermined activity to reduce the risk of hydraulic cylinder buckling in dependence of the result of said evaluation.

11. The method according to claim 10, wherein the at least one evaluation criterion comprises comparing the measured pressure values to a first predefined pressure threshold defining a severe risk of hydraulic cylinder buckling during an outward movement procedure of the piston rod, and if, as a result of said comparison, it is determined that the measured pressure is lower than the first predefined pressure threshold P1, the method comprises performing an activity to reduce the risk of hydraulic cylinder buckling being generating driving instructions to stop the movement of the rod.

12. The method according to claim 11, wherein said first predefined pressure threshold is based upon a known relationship between pressure values in said second chamber, and outward movement forces of the hydraulic cylinder.

13. The method according to claim 10, wherein the at least one evaluation criterion comprises comparing the measured pressure values to a second predefined pressure threshold defining an increased risk of hydraulic cylinder buckling during an outward movement procedure of the piston rod, and if, as a result of said comparison, it is determined that the measured pressure is lower than the second predefined pressure threshold P2, the method comprises performing an activity to reduce the risk of hydraulic cylinder buckling being generating an alert to the operator of the working equipment and/or adapting the generated driving instructions to be applied to the hydraulic system to reduce the movement speed of the piston rod.

14. The method according to claim 10, wherein said at least one evaluation criterion is based upon a known relationship between pressure values in said second chamber, and outward movement forces of the hydraulic cylinder.

15. The method according to claim 10, comprising measuring the fluid pressure on a hydraulic line between said load holding valve unit and said second chamber.

16. The method according to claim 10, wherein the at least one evaluation criterion comprises comparing the measured pressure values to a first predefined pressure threshold defining a severe risk of hydraulic cylinder buckling during an outward movement procedure of the piston rod, and if, as a result of said comparison, it is determined that the measured pressure is lower than the first predefined pressure threshold P1, the method comprises performing an activity to reduce the risk of hydraulic cylinder buckling being generating driving instructions to stop the movement of the rod;

wherein the at least one evaluation criterion further comprises comparing the measured pressure values to a second predefined pressure threshold defining an increased risk of hydraulic cylinder buckling during an outward movement procedure of the piston rod, and if, as a result of said comparison, it is determined that the measured pressure is lower than the second predefined pressure threshold P2, the method comprises performing an activity to reduce the risk of hydraulic cylinder buckling being generating an alert to the operator of the working equipment and/or adapting the generated driving instructions to be applied to the hydraulic system to reduce the movement speed of the piston rod;

wherein said first and second predefined pressure thresholds, respectively, are based upon a known relationship between pressure values in said second chamber, and outward movement forces of the hydraulic cylinder.

* * * * *